United States Patent [19]

Walters

[11] Patent Number: 5,758,002
[45] Date of Patent: May 26, 1998

[54] ROUTING AND STORAGE APPARATUS FOR OPTICAL FIBERS

[75] Inventor: Mark D. Walters, Colleyville, Tex.

[73] Assignee: Siecor Corporation, Hickory, N.C.

[21] Appl. No.: 775,679

[22] Filed: Dec. 31, 1996

[51] Int. Cl.⁶ ............................................. G02B 6/36
[52] U.S. Cl. .......................................... 385/134; 385/135
[58] Field of Search ................................. 385/134, 135, 385/136, 137

[56] References Cited

U.S. PATENT DOCUMENTS

| | | | |
|---|---|---|---|
| Re. 34,955 | 5/1995 | Anton et al. | 385/53 |
| 4,630,886 | 12/1986 | Lauriello et al. | 350/96.2 |
| 4,708,430 | 11/1987 | Donaldson et al. | 350/96.2 |
| 4,770,357 | 9/1988 | Sander et al. | 350/96.21 |
| 4,911,662 | 3/1990 | Debortoli et al. | 439/719 |
| 5,093,885 | 3/1992 | Anton | 385/134 |
| 5,100,221 | 3/1992 | Carney et al. | 385/135 |
| 5,129,030 | 7/1992 | Petrunia | 385/135 |
| 5,179,618 | 1/1993 | Anton | 385/136 |
| 5,339,379 | 8/1994 | Kutsch et al. | 385/135 |
| 5,363,465 | 11/1994 | Korkowski et al. | 385/135 |
| 5,402,515 | 3/1995 | Vidacovich et al. | 385/135 |
| 5,497,444 | 3/1996 | Wheeler | 385/135 |
| 5,511,144 | 4/1996 | Hawkins et al. | 385/135 |
| 5,519,804 | 5/1996 | Burek et al. | 385/135 |

Primary Examiner—John Ngo

[57] ABSTRACT

A vertical routing and storage apparatus for optical fibers is provided comprising an upright member having front and rear vertical faces, a plurality of front channel assemblies adjustably mounted to the front vertical face, and a plurality of rear channel assemblies mounted to the rear vertical face. The upright member is adapted for connection to a supporting frame member and has a plurality of vertically oriented slots formed in the front vertical face. Each front channel assembly has a vertical position which is a adjustable through a range of vertical positions corresponding to the vertical extent of one of the vertical slots. Optical fibers can be routed vertically through the front and rear channels of the routing and storage apparatus and the vertical positions and spacing of the front channel assemblies can be adjusted to advantageously correspond to the vertical positions of optical fiber source equipment adjacent to the front of the apparatus. The interior walls of the channel assemblies can be radiused to prevent the fibers from violating their minimum bending radius. Storage spools, channel assemblies providing side access to the channel, and a dust cap storage cup may also be provided to facilitate the routing and storage of optical fibers.

10 Claims, 4 Drawing Sheets

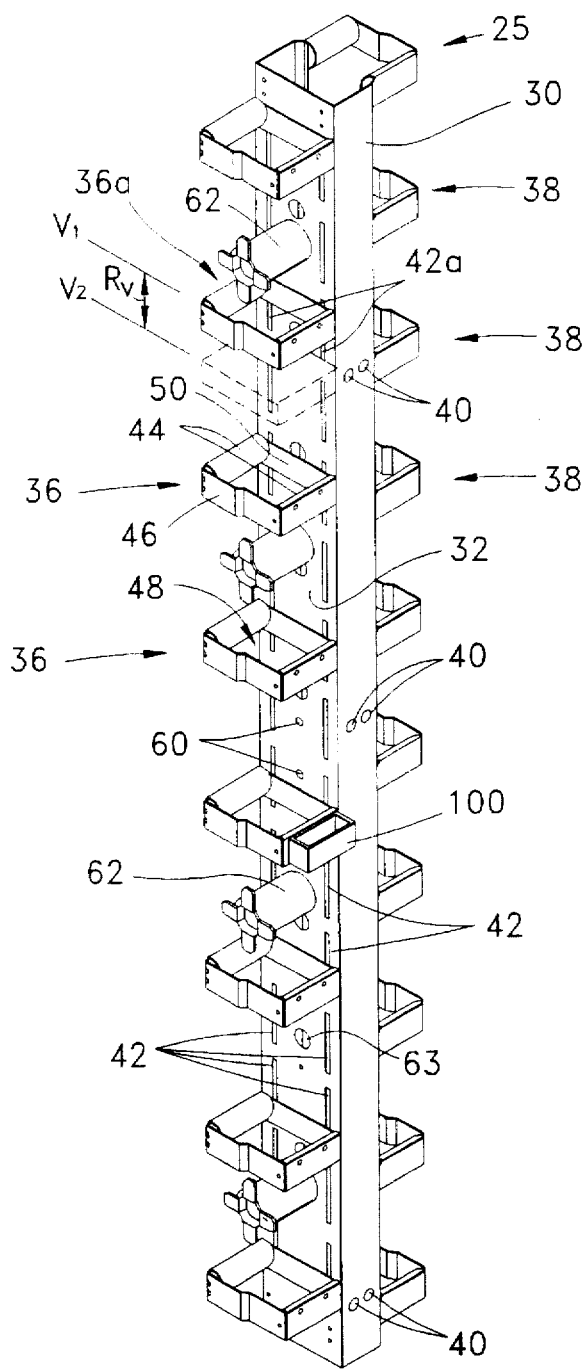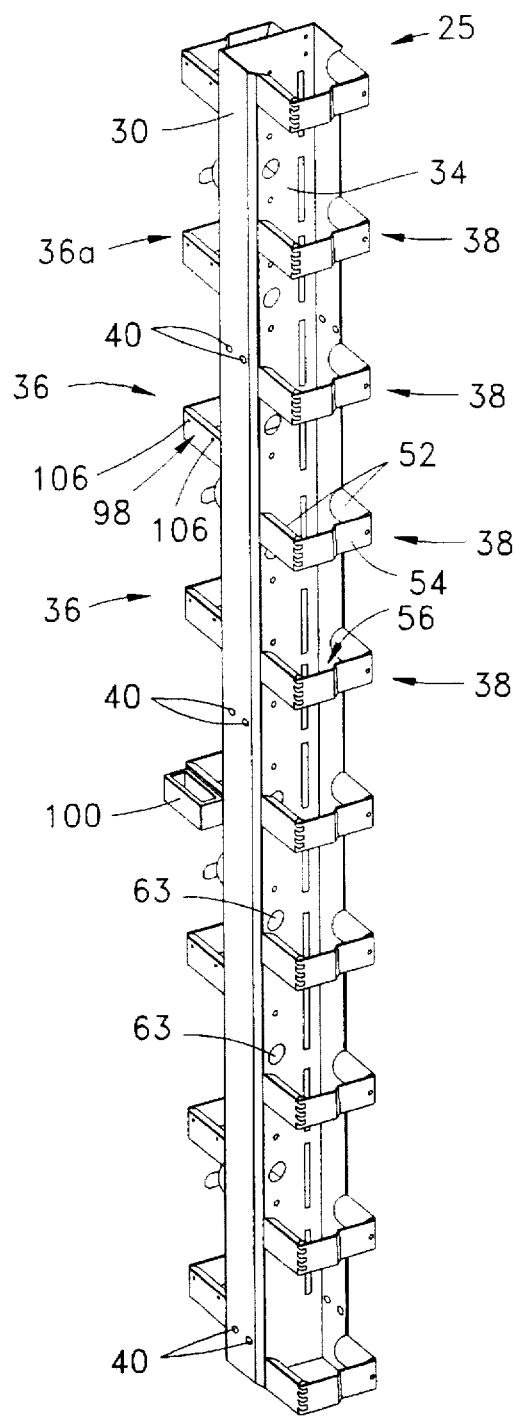
Fig. 2a
Fig. 2b

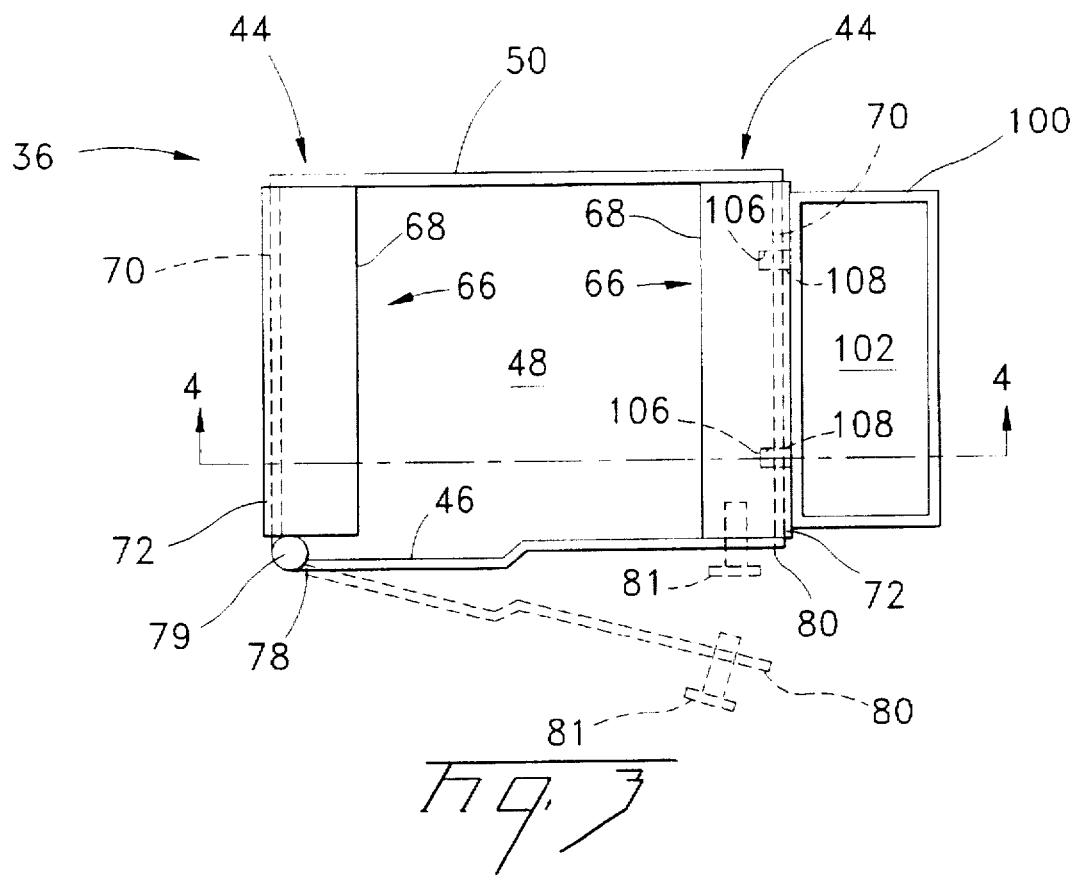
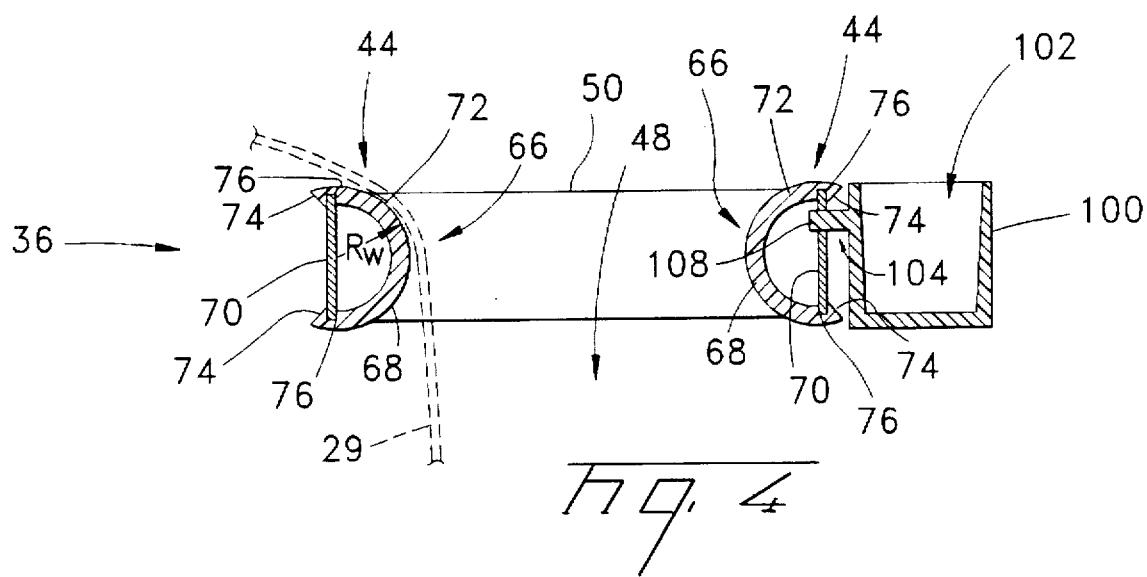

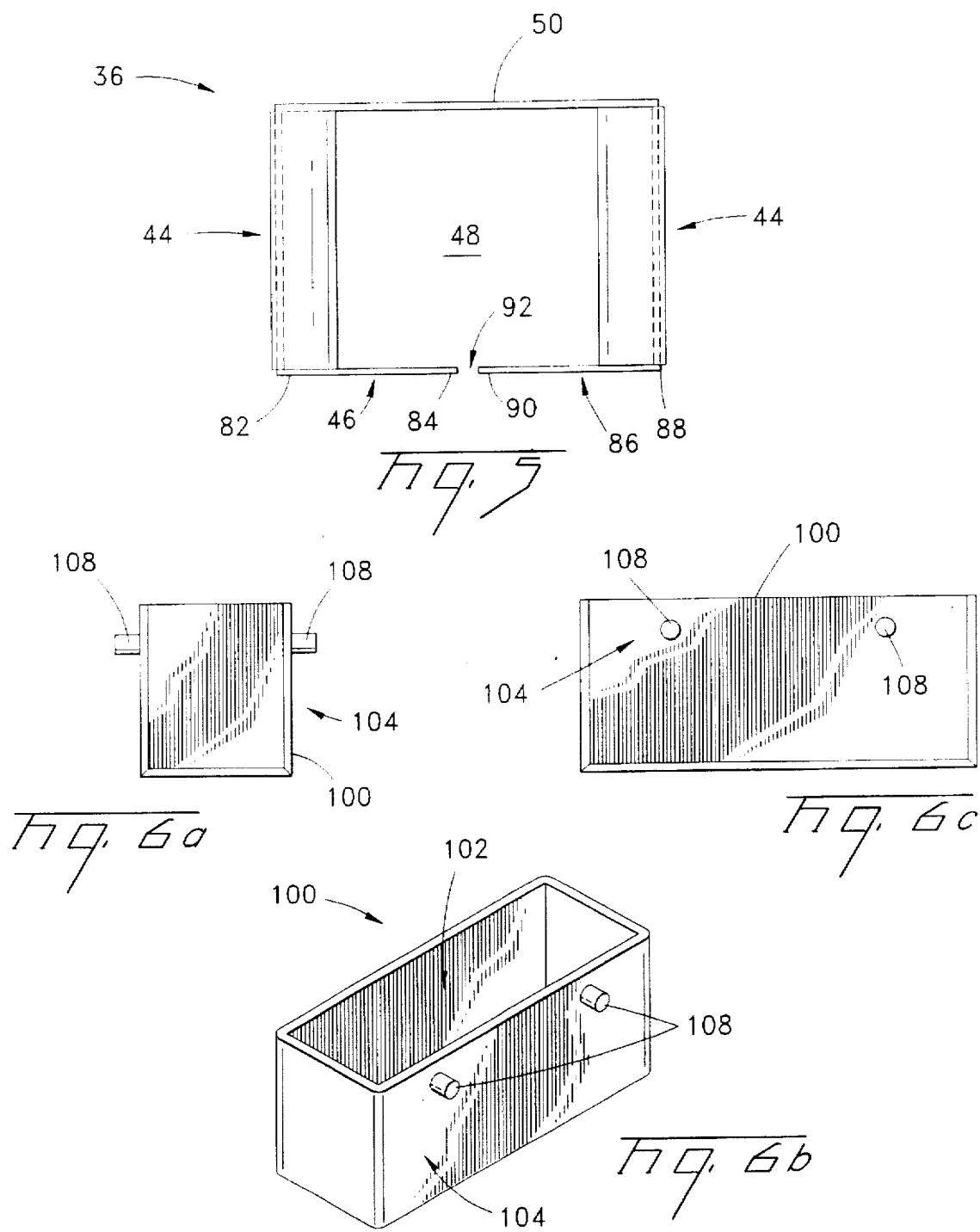

ROUTING AND STORAGE APPARATUS FOR OPTICAL FIBERS

TECHNICAL FIELD OF THE INVENTION

This invention relates to optical wave guides also known as optical fibers. In one aspect it relates to an apparatus for the vertical routing and storage of optical fibers between distribution frames.

BACKGROUND OF THE INVENTION

Optical fibers are increasingly preferred over copper wires for the transmission of telecommunication signals and other data. Once used only in specialized, high-density applications, optical fiber networks are increasingly being utilized in the so-called premises market to provide signal transmission between groups of nearby buildings, such as a university or business campus, and even for intra-building connections of telephone systems, computer networks and other such office systems.

Optical fiber connection apparatus, also known as distribution frames, are used wherever the interconnection or cross-connection of multiple, optical fibers is required, such as where an optical fiber cable comprising numerous individual fibers enters a building for connection to the individual optical fibers of the building's computer network. The distribution frame will generally contain a combination of patch panels, splice housing, hubs, routers, and other equipment. All of the equipment may reside in a single vertical frame or rack, or it may take up two or more racks. In either case, short lengths of optical fiber known as jumpers must be routed vertically along the front side of the rack or between racks to connect equipment. Additionally, the cables that feed the equipment from behind the rack must transition down the side of the rack to reach the equipment.

It is known to use a vertical routing and storage apparatus, also known as an inter-bay routing and storage unit, to provide the room and cable management elements necessary for the vertical routing of jumpers and other optical fibers around the equipment in a distribution frame. The vertical routing and storage apparatus can be positioned between adjacent racks, along the side of a free-standing rack, or along the side of the last rack at the end of a line-up of racks.

It is known to provide various cable management element on vertical routing and storage apparatus to facilitate the support and routing of the fibers. Some such apparatus simply provide spools on the front side to store slack fiber from the jumpers. This keeps the installation neat when one or more jumpers are longer than the exact length necessary to make a given connection. Other such vertical routing and storage apparatus may have a number of assemblies forming "D" or "C" shaped channels (when viewed from above) through which the jumpers are routed. These channel help to keep the jumpers organized and, since the jumpers that are being routed down through the channel must be laid over its edge, the channel partially supports the weight of the jumpers. If, however, the vertical location of a channel is poorly placed relative to the location of the equipment in the adjacent frame, then jumpers to be routed downward through the channel may either hang unsupported or be forced to make an otherwise unnecessary transition upward around the next channel above the equipment before being routed downward through the channel. A need therefore exists, for a vertical routing and storage apparatus having channel assemblies which are vertically adjustable to conform with the vertical position of adjacent equipment.

In addition, if the edge of the channel over which the jumpers are being routed is too sharp, then the jumpers may be pinched, or may violate the minimum recommended bend radius of the jumper. Excessive bending, in the case of optical fibers, can lead to signal loss or premature failure of the fiber. A need therefore exists, for a vertical routing and storage apparatus having channel assemblies with radiused edges which will prevent the fibers from being routed thereto from violating the minimum bending radius.

SUMMARY OF THE INVENTION

In accordance with one aspect of the invention a vertical routing and storage apparatus for optical fibers is provided that comprises an upright member that is adapted for connection to a supporting frame member. A plurality of channel assemblies are adjustably mounted along the upright member such that the assemblies can be slidably adjusted up and down relative to the upright member. The channel assemblies are suitable for routing a plurality of fiber optic jumper cables therethrough.

In accordance with another aspect of the present invention, a vertical routing and storage apparatus for optical fibers is provided. The vertical routing and storage apparatus comprises an upright member having front and rear vertical faces, a plurality of front channel assemblies adjustably mounted to the front vertical face, and a plurality of rear channel assemblies mounted to the rear vertical face. The upright member is adapted for connection to a supporting frame member and has a plurality of vertically oriented slots formed in the front vertical face. Each front channel assembly has a vertical position which is a adjustable through a range of vertical positions corresponding to the vertical extent of one of the vertical slots. Optical fibers can be routed vertically through the front and rear channels of the routing and storage apparatus and the vertical positions and spacing of the front channel assemblies can be adjusted to advantageously correspond to the vertical positions of optical fiber source equipment adjacent to the front of the apparatus.

In accordance with another aspect of the present invention, the channel assemblies include side flanges having an interior wall facing the channel and an inwardly convex surface. This curved surface prevents the fibers from violating their minimum bending radius. In a more preferred embodiment, the inwardly convex surfaces of the interior wall has, when viewed in cross section, a radius within the range of about 0.75 inches. This generally corresponds with the range of permissible bend radius for a fiber optic jumper cable.

In accordance with another aspect of the current invention, the side flanges further comprise an exterior wall facing away from the channel and a radiused insert attached to the exterior wall and forming the interior wall.

In accordance with another aspect of the present invention, the vertical routing and storage apparatus further comprises a plurality of spool mounting holes formed in the front vertical face and a storage spool demountably attached to the front vertical face at one of the spool mounting holes.

In accordance with another aspect of the present invention, the channel assemblies further comprise a cross member having a first end pivotally attached to one of the side flanges and a second end being releasably securable to the other of the side flanges, whereby the position of the cross member can be selectively moved from an open position, which provides an enhanced access to the channel for the positioning of optical fibers, to a closed position, which provides increased security for the storage of optical fibers.

In accordance with another aspect of the present invention, the vertical routing and storage apparatus further comprises a dust cap storage cup including a storage cavity and a mechanism for releasably connecting the cup to a side flange, whereby dust caps from nearby equipment can be advantageously stored in the cup.

BRIEF DESCRIPTION OF THE DRAWINGS

A more complete understanding of the invention and its advantages will be apparent from the following detailed description when taken in conjunction with the accompanying drawings in which:

FIG. 2a is a front perspective view of a vertical routing and storage apparatus according to another embodiment of the present invention;

FIG. 2b is a rear perspective view of the apparatus of FIG. 2a;

FIG. 3 is a top view of a front channel assembly and dust cap storage cup of the apparatus of FIG. 2a;

FIG. 4 is a cross-sectional view of the front channel assembly and dust cap storage cup of FIG. 3, taking along line 4—4 of FIG. 3;

FIG. 5 is a top view of a channel assembly according to an alternative embodiment of the current invention; and FIGS. 6a–6c are, respectively, an end view, a front perspective view and a side view of a dust cap storage cup according to another embodiment of the current invention.

DETAILED DESCRIPTION

Figure 1:
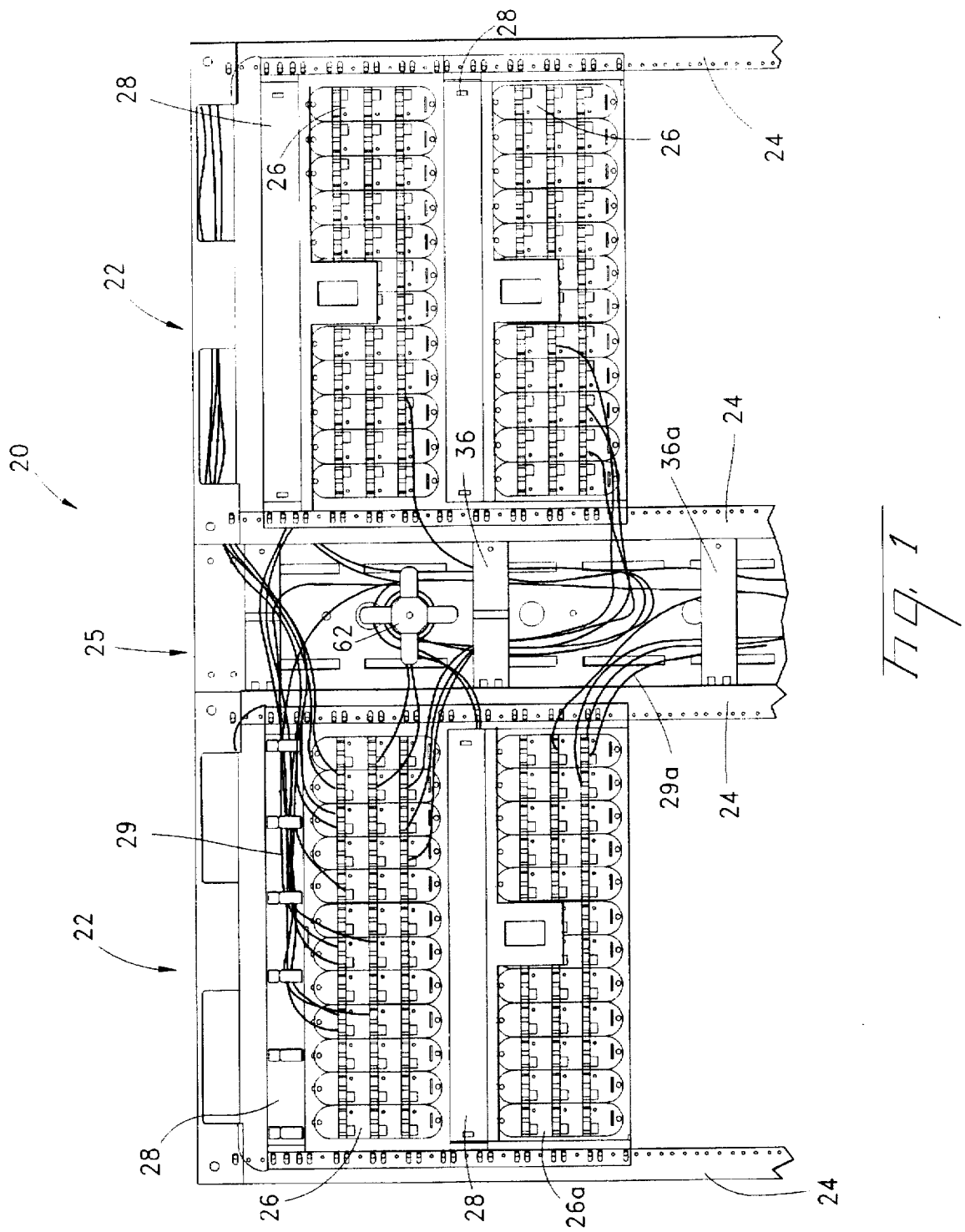
FIG. 1 is a partial front view of an optical fiber distribution facility including a vertical routing and storage apparatus according to one embodiment of the present invention.

Referring now to the drawings, wherein like reference characters designate like or corresponding parts throughout several views, a vertical routing and storage (VRS) apparatus for optical fibers according to one aspect of the present invention is illustrated. Referring first to FIG. 1, a partial front view of a fiber optic distribution facility or distribution frame 20 is shown which includes a VRS apparatus 25. A typical distribution frame such as frame 20 comprises one or more vertical equipment stacks 22, also known as racks or bays, each comprising several components supported by vertical frame members 24. The frame members 24 may be attached to a wall or free standing on the floor. The distribution frame 20 shown in FIG. 1 comprises two equipment bays 22, each including several connector panels 26 and horizontal raceways 28 with a VRS apparatus 25 positioned between equipment bays 22. A number of optical fibers 29 are shown being routed horizontally between bays 22 and vertically through channel assemblies 36 on the VRS apparatus 25. Also shown are excess lengths of the fibers 29, known as slack, being looped around a spool 62 for storage. Note that in the example shown in FIG. 1, the vertical position of the channel assembly designated 36a is not well matched to the vertical position of the connector panel designated 26a, therefore the fibers routed therebetween, designated 29a, are relatively unsupported. The occurrence of such vertical mismatch between fiber connection equipment and the channels of a VRS apparatus is relatively common with prior art apparatus having only fixed channels. The current invention, however, provides for vertically adjustable channels to address the vertical mismatch problem.

Referring now to FIGS. 2a and 2b, a vertical routing and storage apparatus 25 according to another embodiment of the current invention is shown. VRS apparatus 25 comprises an upright member 30 having front and rear vertical surfaces 32, 34, respectively, a plurality of front channel assemblies 36 adjustably mounted to the front vertical face 32, and a plurality of rear channel assemblies 38 mounted to the rear vertical face 34. Upright member 30 is adapted for connection to a supporting frame member (not shown), such as the distribution frame member 24 (shown in FIG. 1). In the embodiment shown in FIGS. 2a and 2b, a plurality of mounting holes 40 are formed in upright member 30 to facilitate connection to a supporting frame member by means of bolts, screws or other fasteners, however, it will be readily apparent that upright member 30 could be otherwise adapted for connection to a supporting frame as is known in the art without departing from the scope of the current invention.

A plurality of vertically oriented slots 42 are formed in front vertical face 32 of VRS apparatus 25. Each of the front channel assemblies 36 has a vertical position which is adjustable through a range of vertical positions corresponding to the vertical extent of one of the vertical slots 42. For example, as best seen in FIG. 2a, the front channel assembly designated 36a has a vertical position, V, which is adjustable through a range of vertical positions, $R_V$, from the upper-most position (shown in solid lines) designated as $V_1$, to the lower-most position (shown in phantom) designated as $V_2$. The range $R_V$ corresponds to the vertical extent of one of the vertical slots, in this case, either of the slots marked 42a. Each front channel assembly 36 includes two front side flanges 44 and a first front cross member 46. The front side flanges 44 are spaced apart from one another and project outwardly from the front vertical face 32. The first front cross member 46 is connected to at least one of the front side flanges 44, thereby defining a front channel 48 generally bounded by the front side flanges 44 and the first front cross member 46.

The front channel assembly 36 can be adjustably mounted to the vertical slots 42 of upright member 30 in a number of ways. In the embodiment shown in FIG. 2a, a second front cross member 50 is connected between the front side flanges 44 at the rear side of channel 48. The second cross member 50 can be adjustably mounted on upright member 30 by means of various fasteners as is known in the art. In a preferred embodiment, so-called cage nuts (not shown) are positioned in vertical slots 42. The cage nuts have internal threads for receiving a threaded fastener which is passed through a hole formed in second front cross member 50. When the fastener is not tightened, the cage nut can slide in slot 42, thus allowing the second front cross member 50 to slide vertically up and down between the top and bottom of the vertical slot 42. When the fastener is tightened, however, the cage nut no longer slides in slot 42, rather it becomes fixed in position, thus securing the front channel assembly 36 in the desired vertical position. The vertical position and spacing of front channel assemblies 36 can thus be adjusted to advantageously correspond to the vertical positions of optical fibers from sources adjacent to front vertical face 32. Front channel assemblies are removable and can either not be used or moved to another pair of slots. Additionally, more than one channel assembly can be used in a pair of slots.

Referring still to FIGS. 2a and 2b, rear channel assemblies 38, as best seen in FIG. 2b, are similar to the front channel assemblies 36, with each rear channel assembly 38 having two rear side flanges 52 and a rear cross member 54. The rear side members 52 are spaced apart from one another and project outwardly from the rear vertical face 34. Rear cross-member 54 is connected to at least one of the rear side faces 52, thereby defining a rear channel 56 bounded by the rear side flanges 52 and the rear cross member 54. In the preferred embodiment shown, the rear channel assemblies 38 are fixedly connected to rear vertical face 34 instead of adjustably connected because the small number of larger cables typically routed on the rear side of a distribution frame do not require precise location of cable management features as do the jumper cables used on the front side. As such is may be easier and less costly to manufacture the back side without accommodating for adjustable assemblies. Rear channels are removable should they not be needed or if they interfere with routing of a large cable or conduit. Further, it will be readily apparent that VRS apparatus having rear channel assemblies which are adjustably mounted to the rear vertical face are within the scope of the current invention. For example, in one such alternative embodiment similar to the VRS apparatus 25 shown, vertically adjustable rear channel assemblies can be provided for mounting to the vertical slots 42 from the rear vertical face 34, since the vertical slots 42, while being formed in the front vertical face 32, can also be accessed from the rear vertical face 34. This would allow vertically adjustable channel assemblies to be mounted on both faces of the VRS apparatus.

Referring still to FIGS. 2a and 2b, to further enhance the routing and storage capabilities of VRS apparatus 25, a plurality of spool mounting holes 60 can be formed in the front vertical face 32 and a storage spool 62 can be demountably attached to the front vertical face 32 at one of the spool mounting holes 60. By using different mounting holes 60, the vertical position of the spool 62 can be selected. The spool 62 can be demountably attached to front vertical face 32 using threaded fasteners such as bolts or screws inserted through the spool mounting holes 60. In the embodiment shown, four storage spools 62 are provided. Feed-through holes 63 formed through vertical member 30 can also be provided allowing cables or fibers (not shown) to be routed from one side of VRS apparatus 25 to the other. When feed-through holes 63 are used, rubber or plastic grommets (not shown) can be positioned in feed-through holes 63 to protect the fibers from being damaged by the edges of the hole.

Referring now to FIGS. 3 and 4, a front channel assembly 36 according to another aspect of the invention is shown. As previously described, it is desirable to prevent the excessive bending of optical fibers 29 (shown in phantom in FIG. 4) as they are routed across the front side flanges 44 into the front channel 48. In this aspect, as best seen in FIG. 4, each front side flange 44 further comprises an interior wall 66, which faces the front channel 48, and an exterior wall 70, which faces away from the front channel. Interior wall 66 has an inwardly convex (with respect to the channel 48) surface 68 that is radiused to prevent excessive bending of the fibers 29 routed there across. In a preferred embodiment of this aspect, the inwardly convex surface 68 of the interior wall 66 has, when viewed in cross section (as shown in FIG. 4), a radius $R_w$ within the range of about 0.75 inches. This corresponds to the range of the permissible bend radius of fiber optic jumper cables.

The inwardly convex surface 68 of interior wall 66 can be formed by directly shaping front side flanges 44 into an inwardly convex cross section. When front side flanges 44 comprise flat metal parts, however, as is often the case with optical fiber equipment, the direct shaping approach can present manufacturing difficulties, especially when trying to avoid so-called bullet ends on the inwardly facing side of the flanges. Referring now specifically to FIG. 4, in another aspect of the current invention, front side flanges 44 comprise an exterior wall 70 facing away from the channel 48 and a radiused insert 72 connected to the exterior wall. The radiused insert 72, which can be formed of various materials known in the art including metals and plastics, is preferably formed of extruded plastic which can be conveniently cut to the proper length. Radiused insert 72 is attached to exterior wall 70 thereby forming interior wall 66 having the desired inwardly convex surface 68. In the embodiment shown in FIG. 4, radiused inserts 72 have chamfered ends 74 and notches 76 sized to facilitate convenient snap-on attachment to exterior wall 70, however, other means for the attachment of radiused inserts 72 to exterior walls 70, including adhesives, screws, bolts and other such fastenings known in the art, can be used without departing from the scope of the current invention. It will also be readily apparent that while the foregoing description relates specifically to the front side flanges 44 and front channel assemblies 36 of VRS apparatus 25, it can further be applied to the rear side flanges 52 and rear channel assemblies 38 without significant change.

Referring again to FIG. 3, to further facilitate the routing and storage of optical fibers using VRS apparatus 25, is desirable that the front channel assemblies allow side access for the positioning of optical fibers in the channels, rather than requiring them to be threaded in from one end or the other. In another aspect of the current invention, the first front cross member 46 further comprises a first end 78 which is pivotally attached to one of the front side flanges 44 and a second end 80 which is releasably securable to the other of the front side flanges 44. In the embodiment shown, a hinge 79 is provided for connecting first end 78 to side flange 44. The position of the front cross member 46 can thus be moved between an open position (shown in phantom in FIG. 3), which provides side access for the convenient positioning of optical fibers into the front channel 48, to a closed position (shown in solid lines in FIG. 3), providing no side access to the front channel 48 and increased security to the optical fibers stored within. A latch mechanism 81, can be provided for releasably securing second end 80 to the other side flange 44. The latch mechanism is preferably a swell latch which expands and contracts, respectively, when an activating lever is pushed in and pulled out, however other latch mechanisms known in the art can be used without departing from the scope of the current invention. While FIG. 3 and the foregoing description relate specifically to a front channel assembly 36, it will be readily apparent that the foregoing description can also be applied to the rear side flanges 52 and rear channel assemblies 38 without significant change.

Referring now to FIG. 5, in an alternative embodiment of the current invention, the front channel assemblies 36 can further comprise a first front cross member 46 having a fixed end 82 and a free end 84 and a third front cross member 86 having a fixed end 88 and a free end 90. The fixed end 82 of the front cross member 46 is connected to one of the front side flanges 44 and the free end 84 extends towards the other of the front side flanges 44. The fixed end 88 of the third front cross member 86 is connected to the other of the front side flanges 44 and the free end 90 extends generally toward the free end 84 of the first front cross member 46, thereby defining a gap 92 therebetween. Optical fibers (not shown) may be moved into front channel 48 by passing through the gap 92 between the free ends 84, 90 of the first and third front cross members 46, 86. The channel assembly 36 of this embodiment is substantially identical in all other respects to those of previously discussed embodiments. Also, while FIG. 5 and the foregoing description relate specifically to a front channel assembly 36, it will be readily apparent that the foregoing description can also be applied to the rear channel assemblies 38 without significant change.

Optical fiber adaptors and other devices used in distribution frames such as that shown in FIG. 1 are typically provided with small removable dust caps to prevent damage or contamination prior to use. When these caps are removed by the installer or technician working on the frame, they are frequently placed on the first available surface and forgotten. These discarded dust caps invariably fall to the floor or into openings in the equipment, forming an unattractive and possibly hazardous litter. Referring now generally to FIGS. 2a, 2b, 3 and 4 and specifically to FIGS. 6a–6c, in another aspect of the current invention, the VRS apparatus 25 further comprises a dust cap storage cup 100 which is releasably mounted to one of the front side flanges 44. The dust cap storage cup 100 includes a storage cavity 102 and a connecting mechanism 104. The storage cavity 102 provides a place where dust caps can be advantageously stored for ready access by personnel working on nearby equipment and to prevent the caps from falling into equipment or onto the floor. The connecting mechanism 104 releasably secures the cup 100 to the front side flange 44. If necessary, a compatible connecting mechanism 98 can be provided on front side flanges 44 to cooperate with connecting mechanism 104 of the cup. For example, in the embodiment shown in FIGS. 2, 3, 4, and 6a–6c (best seen in FIGS. 3 and 4), flange connecting mechanism 98 comprises holes 106 formed in the exterior wall 70 of front side flanges 44 and cup connecting mechanism 104 comprises pegs 108 adapted for frictional fit within holes 106. While the peg-in-hole connecting mechanism used in the current embodiment is simple to manufacture and use, other connecting mechanisms known in the art, including clips, hangers, hook and loop material, and releasable adhesives can also be used to connect the cup 100 to the channel assemblies 36. Alternately, the flange connecting mechanism 98 can be used alone to releasably mount the cup 100 if appropriate. While the foregoing description relates specifically to a cup 100 for mounting on a front channel assembly 36, it will be readily apparent that the cup 100 can also be mounted to the rear channel assemblies 38 without significant change.

Although several embodiments of the present invention have been illustrated in the accompanying drawings and described in the foregoing Detailed Description, it will be understood that the invention is not limited to the embodiments disclosed, but is capable of numerous rearrangements, modifications and substitution of parts and elements without departing from the scope and spirit of the invention.

I claim:

1. A vertical routing and storage apparatus for optical fibers comprising:
   an upright member having front and rear vertical faces and being adapted for connection to a supporting frame member;
      said front vertical face having a plurality of vertically oriented slots formed therein;
   a plurality of front channel assemblies adjustably mounted to said front vertical face;
      each said front channel assembly having two front side flanges and a first front cross member and having a vertical position which is adjustable through a range of vertical positions corresponding to the vertical extent of one of said vertical slots;
      said front side flanges being spaced apart from one another and projecting outwardly from said front vertical face;
      said first front cross member being connected to at least one of said front side flanges thereby defining a front channel generally bounded by said front side flanges and said first front cross member; and
   a plurality of rear channel assemblies mounted to said rear vertical face;
      each said rear channel assembly having two rear side flanges and a rear cross member; said rear side members being spaced apart from one another and projecting outwardly from said rear vertical face;
      said rear cross member being connected to at least one of said rear side flanges thereby defining a rear channel bounded by said rear side flanges and said rear cross member;
   whereby optical fibers may be routed through said front and rear channels and the vertical positions and spacing of said front channel assemblies can be adjusted to advantageously correspond to the vertical positions of optical fibers from sources adjacent to said front vertical face.

2. A vertical routing and storage apparatus according to claim 1, further comprising:
   a plurality of spool mounting holes formed in said front vertical face; and
   a storage spool demountably attached to said front vertical face at one of said spool mounting holes.

3. A vertical routing and storage apparatus according to claim 1, wherein said front side flanges further comprise an interior wall facing said front channel and having an inwardly convex surface.

4. A vertical routing and storage apparatus according to claim 3, wherein said inwardly convex surfaces of said interior wall has, when viewed in cross section, a radius within the range of about 0.75 inches.

5. A vertical routing and storage apparatus according to claim 3, wherein said front side flanges further comprise:
   an exterior wall facing away from said channel; and
   a radiused insert being attached to said exterior wall and forming said interior wall.

6. A vertical routing and storage apparatus according to claim 3, further comprising:
   a plurality of spool mounting holes formed in said front vertical face; and
   a storage spool demountably attached to said front vertical face at one of said spool mounting holes.

7. A vertical routing and storage apparatus according to claim 3, wherein said first front cross members each further comprise:
   a first end being hingedly attached to one of said front side flanges; and
   a second end being releasably securable to the other of said front side flanges;
   whereby the position of said first front cross member can be moved to selectively provide enhanced access to said front channel for the positioning of optical fibers into said front channel and to close access to said front channel for the storage of optical fibers.

8. A vertical routing and storage apparatus according to claim 3, wherein said front channel assemblies each further comprise:
   a fixed end and a free end being formed on said first front cross member;
      said fixed end being connected to one of said front side flanges;
      said free end extending toward the other of said front side flanges; and
   a second front cross member having a fixed end and a free end;

said fixed end being connected to the other of said front side flanges;

said free end extending generally toward the free end of said first front cross member thereby defining a gap therebetween;

whereby optical fibers may be moved into the front channel by passing through the gap between the free ends of the first and second front cross members.

9. A vertical routing and storage apparatus according to claim 1, wherein said front side flanges each further comprise a flange connecting mechanism for releasably securing a dust cover storage cup thereto.

10. A vertical routing and storage apparatus according to claim 9, further comprising:

a dust cap storage cup including a storage cavity and a cup connecting mechanism for releasably connecting said cup to said flange connecting mechanism of said front side flange;

whereby dust caps can be advantageously stored in said dust cap storage cup for ready access by personnel working on nearby equipment and to prevent said caps from falling into equipment or onto the floor.

* * * * *